N. C. BRIGGS.
DIRECTION INDICATOR.
APPLICATION FILED FEB. 21, 1919.
1,329,751.
Patented Feb. 3, 1920.
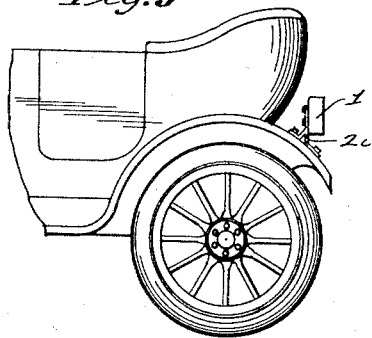
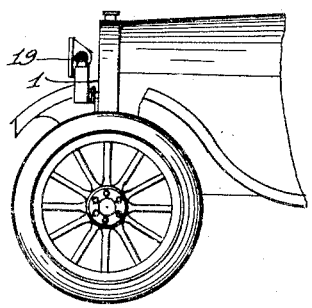
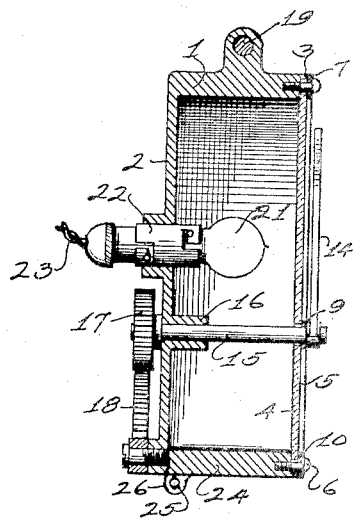
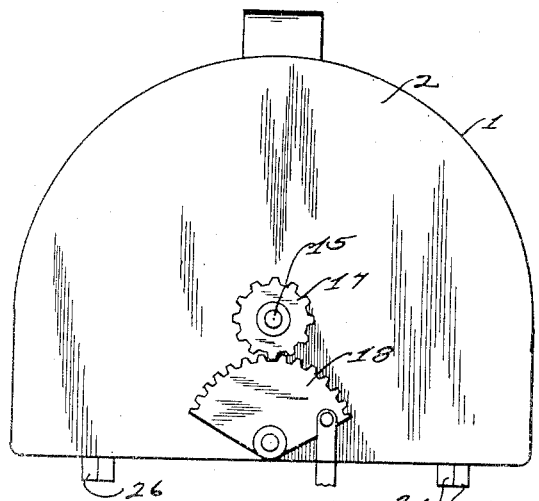
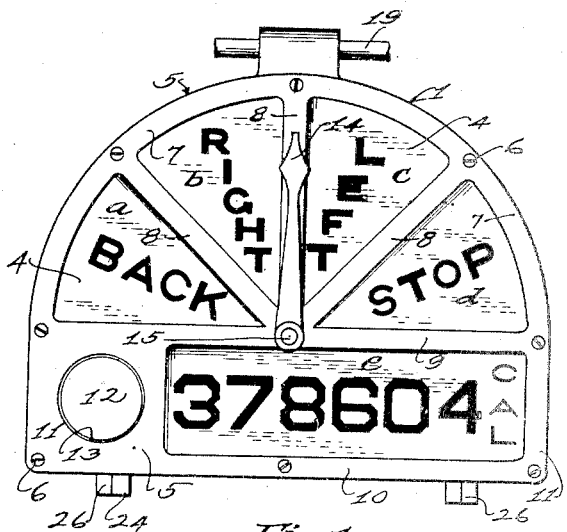
INVENTOR:
Nathaniel C. Briggs,
by Mack & Litzenberg
Attorneys

UNITED STATES PATENT OFFICE.

NATHANIEL C. BRIGGS, OF LOS ANGELES, CALIFORNIA.

DIRECTION-INDICATOR.

1,329,751. Specification of Letters Patent. Patented Feb. 3, 1920.

Application filed February 21, 1919. Serial No. 279,919.

*To all whom it may concern:*

Be it known that I, NATHANIEL C. BRIGGS, a citizen of the United States, and a resident of Los Angeles, in the county of Los Angeles and State of California, have invented new and useful Improvements in Direction-Indicators, of which the following is a specification.

My invention relates to direction indicators for use on motor vehicles, or vehicles of other character, and the primary object of the invention is to provide a simple form of indicator which is capable of attachment to a vehicle at the front and rear ends, whereby a contemplated change of direction may be indicated to other vehicles and pedestrians moving with and in an opposite direction to the vehicle equipped with my device.

A further object is to provide a form of device comprising a housing capable of indicating a right or left turn, a back-up or a stop, together with a display of the vehicle license number thereon the interior of said housing being illuminated and the exposed side of the housing being provided with a transparent element subdivided into a plurality of sections upon each of which may be formed or printed different directions and the number of the license; also a tail light may be provided in the housing, in lieu of the usual separate lamp. Other objects may appear as the description progresses.

I attain the above objects by means of the device illustrated in the accompanying drawing, forming a part of this application, in which:

Figure 1 is a front view of my improved indicator.

Fig. 2 is a rear view of the same.

Fig. 3 is a vertical section of the indicator shown in Figs. 1 and 2.

Fig. 4 is a fragmentary side elevation of the front portion of an automobile and Fig. 5 is an elevation of the rear portion thereof showing my indicators mounted for use.

In the consideration of the present invention, reference is had to my pending application for patent for improvements in direction indicators, filed June 17, 1918, Serial Number 240,550, in which is disclosed another form of indicator and the operating mechanism of which may be applied to a vehicle for operating the device to be herein described.

In the present invention, I provide a single housing 1 for displaying the traffic directions, the license number and the danger, or usual tail light, said housing being preferably of a fan-like form with a semi-rectangular bottom, all of one side of which is covered by a single piece or sheet of glass or other suitable transparent material, with the exception of the tail light.

The housing 1 is preferably of cast metal and has a rear wall 2 and recessed front edges 3 against which a glass 4 may be held by means of a suitable retaining member 5 and a plurality of screws 6, the member 5 being of the form of the housing and skeleton like with a curved exterior portion 7 connected by means of arms 8 with a horizontal arm 9. A bottom arm 10 is connected with the ends of the curved outer portion by means of the side arms 11, thus providing a plurality of subdivisions, as at $a$, $b$, $c$, $d$ and $e$, in the front of the housing. The tail light lens 12 may be suitably held in an opening 13 at one end of the housing in line with the opening $e$, as shown.

Each of the openings, $a$, $b$, $c$ and $d$ between the arms of the retaining member 5 has the form of a sector and that portion of the glass 4 within each of said openings may be provided with printed or painted words, such as "Back", "Right", "Left", and "Stop", in the order named from left to right, or vice versa, depending upon the character of the operating connections from the driver's seat. A license number, as shown, may be painted upon the glass within the opening below the diametral arm 9.

An indicator, or pointer 14 is pivoted at the center of the curved periphery of the housing 1 on a transverse shaft 15 which has a bearing in a boss 16 formed on the rear wall 2 and the outer end of which shaft carries a pinion 17. A sector 18 is pivotally mounted on the rear wall 2 of the housing and meshes with the pinion 17 and is adapted to be operated from the driver's seat of the vehicle by means of a suitable operating mechanism of the character shown in my former application for patent and hereinbefore referred to. The pitch line of the sector 18 is substantially greater in diameter than that of the pinion 17 so that a minimum movement of said sector will effect a maximum movement of the pinion and indicator 14.

One of the indicators is adapted to be mounted at the front end of the vehicle, as shown in Fig. 4, a lug being provided on the top of housing 1 through which the usual lamp support rod 19 may be extended for supporting the indicator midway of the lamps, or the housing may be otherwise suitably held in position on the front end of the vehicle. As shown, the housing 1 is attached to the rear end of the vehicle on the fender in lieu of the usual tail light by means of a suitable bracket 20 of any desired form.

It is preferable that both of the indicators should be connected with a common operating means so that the front and rear indicators will operate in unison for displaying like signs, the pointer 14, for instance, being moved to the left serving to indicate on both indicators a turn in one or the other direction, and when moved to the right a turn in an opposite direction will be indicated. Likewise a further movement of the pointer to a greater extent than for a turn in either direction, will indicate an intention to back up or stop.

One or more lamps, as at 21, may be provided for illuminating the interior of the housing, said lamp being held in a socket 22 suitably attached to the rear wall 2 of the housing and being carried for connection, by means of a lamp cord 23, with the electrical system of the automobile.

Access may be had to the interior of the housing by removing the front retaining member 5 and glass 4, or by means of the hinged bottom 24 which is pivoted to the rear wall 2 by means of pins 25 extending through the lugs 26 formed thereon.

What I claim is:

A direction indicator comprising a housing having a rectangular base portion and a semi-circular top portion, a transparent element covering the front of said housing, a skeleton cover removably attachable to the front edges of said housing and having a plurality of similar openings therein in the form of sectors, a single rectangular opening therein and a circular opening therein, the words "Back", "Right" and "Stop", being marked on said transparent element within said sector openings, the license number being marked on said transparent element within said rectangular opening, and a danger lens being held in said circular opening, a shaft transversely extended through said housing and said skeleton cover, a pointer adjacent to said cover and movable thereover, gearing on the rear side of said housing for operating said pointer, a lamp supported within and for illuminating said housing.

NATHANIEL C. BRIGGS.

In the presence of—
LUTHER L. MACK,
H. M. BRUNDAGE.